United States Patent
Tanizawa et al.

(10) Patent No.: US 7,792,193 B2
(45) Date of Patent: Sep. 7, 2010

(54) IMAGE ENCODING/DECODING METHOD AND APPARATUS THEREFOR

(75) Inventors: Akiyuki Tanizawa, Kawasaki (JP); Takeshi Chujo, Yokohama (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 1210 days.

(21) Appl. No.: 11/376,087

(22) Filed: Mar. 16, 2006

(65) Prior Publication Data
US 2006/0209952 A1 Sep. 21, 2006

(30) Foreign Application Priority Data
Mar. 16, 2005 (JP) ............... 2005-075935

(51) Int. Cl.
H04B 1/66 (2006.01)
H04N 7/12 (2006.01)
H04N 11/02 (2006.01)
H04N 11/04 (2006.01)

(52) U.S. Cl. ............... 375/240.16; 375/240.18; 375/240.2; 375/240.22; 375/240.05; 375/240.12; 382/239; 382/238; 348/405.1; 348/404.1; 348/407.1

(58) Field of Classification Search ............ 375/240.16, 375/240.18, 240.2, 240.22, 240.23, 240.05, 375/240.12, 240.13; 382/239, 238; 348/405.1, 348/404.1, 407.1
See application file for complete search history.

(56) References Cited

U.S. PATENT DOCUMENTS

| | | | | |
|---|---|---|---|---|
| 5,694,173 A | * | 12/1997 | Kimura et al. | 348/423.1 |
| 5,978,544 A | * | 11/1999 | Shimada et al. | 386/112 |
| 6,711,295 B2 | * | 3/2004 | Nakayama et al. | 382/232 |
| 7,502,517 B2 | * | 3/2009 | Kodama et al. | 382/239 |

FOREIGN PATENT DOCUMENTS

JP 2004-128749 4/2004

OTHER PUBLICATIONS

Joint Video Team of ISO/IEC MPEG & ITU-T VCEG, 12th Meeting: Redmond, WA, "JVT-L049d8," Jul. 2004, pp. i-123.
ISO/IEC 13818-2, Information technology—Generic coding of moving pictures and associated audio information: Video, chap. 7, sec. 4, "Inverse quantisation," Second edition Dec. 15, 2000.

(Continued)

Primary Examiner—Phuong Phu
(74) Attorney, Agent, or Firm—Nixon & Vanderhye PC

(57) ABSTRACT

An image encoding method includes generating a predictive signal and encoding mode information according to each encoding mode from a macroblock signal corresponding to each macroblock, selecting a quantization code table corresponding to each macroblock, generating a predictive error signal for each encoding mode based on the macroblock signal and the predictive signal, subjecting the predictive error signal to orthogonal transformation, quantizing the orthogonal-transformed predictive error signal while changing a quantization parameter for every plural sub-pixel-blocks, using the quantization code table corresponding to the macroblock, encoding quantization transformation coefficient, calculating an encoding cost, selecting one encoding mode based on the encoding cost, selecting one quantization code table based on the encoding cost, and encoding information of an index indicating the selected quantization code table for every frame of the input image signal or every region of the frame.

18 Claims, 8 Drawing Sheets

OTHER PUBLICATIONS

U.S. Appl. No. 11/268,721, filed Nov. 8, 2005, Matsumura et al., *Variable-length Coding Device and Method of the Same*.

Decision of patent grant dated Jun. 17, 2008 in Patent Application No. 2005-075935.

* cited by examiner

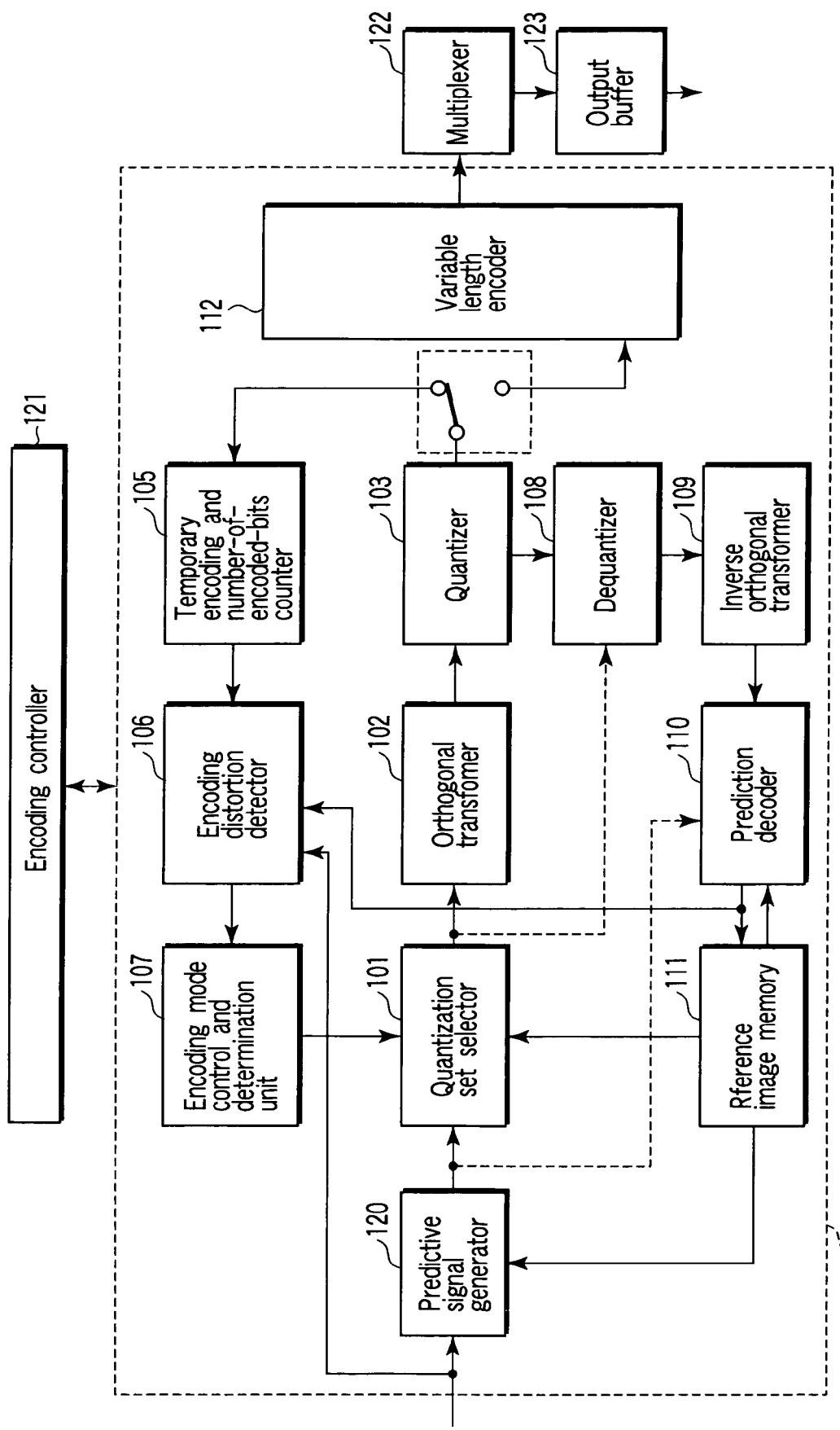
F I G. 1

Vblk = { 1,1,-1,-1 }
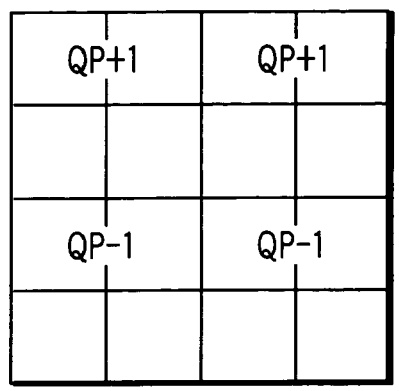
4x4 pixel block quantizer
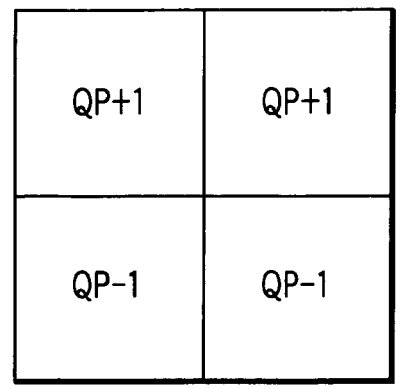
8x8 pixel block quantizer
F I G. 3
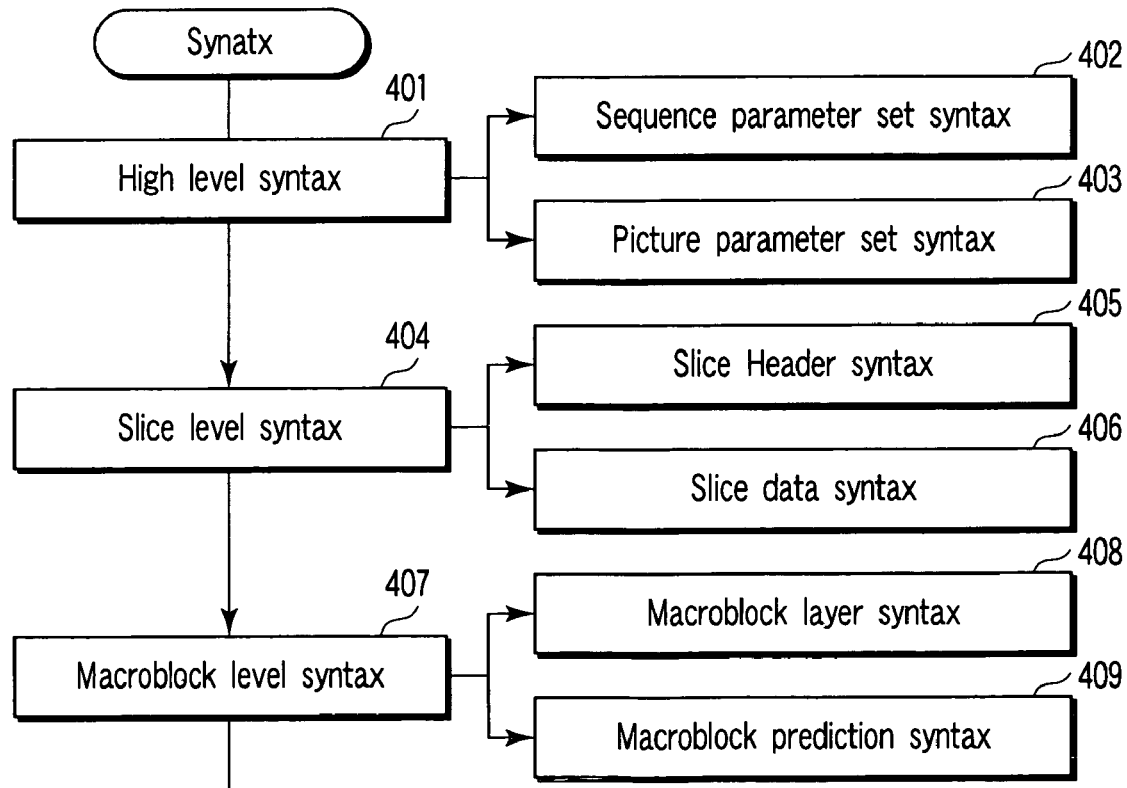
F I G. 4

FIG. 5

```
sequence_parameter_set_rbsp() {
  ...
  ex_quant_code_in_slice_frag
  ex_quant_code_in_mb_flag
  ...
}
```

FIG. 6

```
slice_header() {
  ...
  if(ex_quant_code_in_slice_frag) {
    slice_ex_code_zero_flag
    if(slice_ex_code_zero_flag)
      rem_slice_ex_code_num
  }
  ...
}
```

FIG. 7

```
macroblock_layer() {
  ...
  if(ex_quant_code_in_mb_frag) {
    mb_ex_code_zero_flag
    if(mb_ex_code_zero_flag)
      rem_mb_ex_code_num
  }
  ...
}
```

FIG. 8

```
slice_header() {
  ...
  slice_ex_code_num
  ...
}
```

FIG. 9

```
macroblock_layer() {
  ...
  mb_ex_code_num
  ...
}
```

| Quantization code index | Quantization variable value (block number) | | | | Effective range of QP |
|---|---|---|---|---|---|
| | 0 | 1 | 2 | 3 | |
| 0 | 0 | 0 | 0 | 0 | 32 |
| 1 | 1 | 1 | -1 | -1 | 32 |
| 2 | -1 | -1 | 1 | 1 | 32 |
| 3 | 1 | -1 | 1 | -1 | 32 |
| 4 | -1 | 1 | -1 | 1 | 32 |
| 5 | 1 | -1 | -1 | 1 | 32 |
| 6 | -1 | 1 | 1 | -1 | 32 |
| 7 | 1 | 0 | 0 | -1 | 32 |
| 8 | -1 | 0 | 0 | 1 | 32 |
| 9 | 1 | -1 | 0 | 0 | 20 |
| 10 | -1 | 1 | 0 | 0 | 20 |
| 11 | 0 | 0 | 1 | -1 | 20 |
| 12 | 0 | 0 | -1 | 1 | 20 |
| 13 | 0 | 1 | -1 | 0 | 20 |
| 14 | 0 | -1 | 1 | 0 | 20 |
| 15 | 1 | 0 | -1 | 0 | 20 |
| 16 | -1 | 0 | 1 | 0 | 20 |
| 17 | 0 | 1 | 0 | -1 | 20 |
| 18 | 0 | -1 | 0 | 1 | 0 |
| 19 | 2 | -1 | -1 | 0 | 0 |
| 20 | -1 | 2 | 0 | -1 | 0 |
| 21 | -1 | 0 | 2 | -1 | 0 |
| 22 | 0 | -1 | -1 | 2 | 0 |
| 23 | 2 | 0 | 0 | -2 | 0 |
| 24 | 0 | 2 | -2 | 0 | 0 |
| 25 | 0 | -2 | 2 | 0 | 0 |
| 26 | -2 | 0 | 0 | 2 | 0 |
| 27 | 2 | 2 | -2 | -2 | 0 |
| 28 | -2 | -2 | 2 | 2 | 0 |
| 29 | 2 | -2 | 2 | -2 | 0 |
| 30 | -2 | 2 | -2 | 2 | 0 |
| 31 | -2 | 2 | 2 | -2 | 0 |
| 32 | 2 | -2 | -2 | 2 | 0 |

FIG. 10

```
sequence_parameter_set_rbsp() {
   ...
   ex_quant_matrix_in_slice_flag
   ex_quant_matrix_in_mb_flag
   ...
}
```

FIG. 12

```
slice_header() {
   ...
   slice_ex_matrix_flag
   ...
}
```

FIG. 13

```
macroblock_layer() {
   ...
   mb_ex_matrix_flag
   ...
}
```

FIG. 14

IMAGE ENCODING/DECODING METHOD AND APPARATUS THEREFOR

CROSS-REFERENCE TO RELATED APPLICATIONS

This application is based upon and claims the benefit of priority from prior Japanese Patent Application No. 2005-075935, filed Mar. 16, 2005, the entire contents of which are incorporated herein by reference.

BACKGROUND OF THE INVENTION

1. Field of the Invention

The present invention relates to an image encoding/decoding method for encoding/decoding a video or still image and an apparatus therefor.

2. Description of the Related Art

In recent years, a video encoding method that the encoding efficiency is improved more largely than before is recommended for ITU-TRec.H.264 and ISO/IEC14496-10 in conjunction with ITU-T and ISO/IEC. A conventional encoding system such as ISO/IECMPEG-1,2,4, ITU-TH.261, H.263 performs compression with two-dimensional discrete cosine transformation (DCT) of a 8*8 block. In contrast, since an encoding system of H.264 uses two-dimensional integer orthogonal transformation of a 4*4 block, it needs not consider IDCT mismatch, and make it possible to carry out an operation with a 16-bit register.

Also, the H.264 encoding system makes it possible to recognize an orthogonal transformation process and a quantization process by addition and bit shift. A dequantization process and an inverse integer orthogonal transformation process can be realized by addition and bit shift like the orthogonal transformation and quantization process.

Further, in H.264, development of a profile including a new encoding tool is progressed in order to realize improvement of an encoding efficiency or a subjective image quality for a high-resolution image such as a high-definition television image. In, for example, High profile (Joint Video Team (JVT) of ISO/IEC MPEG & ITU-T VCEG, 12th Meeting: Redmond, Wash., USA 17-23 Jul., 2004, "JVT-L047d8") of H.264, it is expected that a quantization matrix technology (ISO/IEC 13818-2: 2000 Information technology—Generic coding of moving pictures and associated audio information: Video) such as two-dimensional integer orthogonal transformation of a 8*8 block or a MPEG-2 is introduced, and a profile directed to a high-resolution image and a subjective image quality is provided.

A general quantization process in image encoding is done based on the following equation (1).

$$X_{ij} = int\left(\frac{|Y_{ij}| + f}{Q_{step}}\right) \cdot sgn(Y_{ij}) \quad (1)$$

where Xij indicates a quantized transformation coefficient matrix, Qstep a quantization step, and Yij a transformation coefficient matrix. On the other hand, the general dequantization process is done based on the following equation (2).

$$Y'_{ij} = X_{ij} \times Q_{step} \quad (2)$$

In H.264, the dequantization shown by the following equation is done to realize an operation precision of 16-bit with a little operation. For example, the dequantization process (an error signal of a 4*4 pixel block) of a H.264 High profile is shown in the following equation (3).

$$Y_{ij} = X_{ij} \times LS(m,i,j) << (QP/6) \quad (3)$$

where a level scale LS(m, i, j) is a value defined by the following equation (4), and QP is a quantization parameter indicating a value in a range from 0 to 51.

$$LS(m,i,j) = WS(i,j) \times \text{Norm}(m,i,j) \quad (4)$$

Norm(m, i, j) indicates a scale adjustment parameter expressed by the equation (5), and each element is expressed by the equation (6).

$$\text{Norm}(m, i, j) = \begin{cases} v_{m,0} & \text{for } (i,j) = \{(0,0), (0,2), (2,0), (2,2)\}, \\ v_{m,1} & \text{for } (i,j) = \{(1,1), (1,3), (3,1), (3,3)\}, \\ v_{m,2} & \text{otherwise;} \end{cases} \quad (5)$$

$$v_{mn} = \begin{bmatrix} 10 & 16 & 13 \\ 11 & 18 & 14 \\ 13 & 20 & 16 \\ 14 & 23 & 18 \\ 16 & 25 & 20 \\ 18 & 29 & 23 \end{bmatrix} \quad (6)$$

Further, WS(i, j) represents a quantization matrix, and can select the matrix expressed by, for example, equation (7).

$$WS(i,j) = \begin{bmatrix} 6 & 12 & 20 & 27 \\ 12 & 20 & 27 & 32 \\ 20 & 27 & 32 & 37 \\ 27 & 32 & 37 & 41 \end{bmatrix} \quad (7)$$

In H.264, the QP value (quantization parameter) of the equation (3) is prescribed so as to have the same value in the macroblock. The High profile can take two kinds of conversion block sizes of a 4*4 block and a 8*8 block. At the same time, the quantization process can be done with two kinds of quantization bock sizes of the 4*4 block and 8*8 block.

For example, the intra-prediction of H.264 has nine modes for each of the 4*4 block and the 8*8 block and four modes for a 16*16 block. The distribution of the transformation coefficients obtained by subjecting to orthogonal transformation the predictive error occurring according to the prediction mode or the block size differs for every block. Similarly, in the inter-prediction, it is possible to select an arbitrary block from blocks of seven kinds of motion compensation block sizes. There are a great number of combinations of predictions due to the motion vectors provided from a plurality of reference images. Therefore, since a predictive block size and a reference image differ from each other in the macroblock, the distribution of the transformation coefficients obtained by subjecting the predictive error to orthogonal transformation is apt to differ for every block.

Further, in H.264, the quantization matrix can be changed for every sequence or every picture. Since the quantization matrix contributes in particular to improvement of a subjective image quality greatly, it is important to design an optimum matrix according to an image to be encoded. However, the matrix is originally weighted to coefficient distribution in a frequency domain, so that the optimum matrix differs for every pixel region when the coefficient distribution differs for every block.

As discussed above, in H.264, the dequantizer can not be changed according to a predictive block shape in the macroblock and a prediction mode. Accordingly, there is a problem that transformation coefficients in a small pixel block in the macroblock cannot be finely controlled.

Further, when a quantization parameter is determined and dequantized for every macroblock by a method prescribed in the H.264 High profile, using a given quantization matrix, there is a problem that it is impossible to control transformation coefficients according to a predictive block shape in the macroblock and a prediction method.

The object of the present invention is to provide a video encoding method for encoding an image by quantizing a predictive error signal in units of a block smaller than a macroblock referring to a quantization code table.

BRIEF SUMMARY OF THE INVENTION

An aspect of the present invention provides an image encoding method for encoding an image signal according to an encoding mode, comprising: generating a predictive signal and encoding mode information according to each of a plurality of encoding modes from a macroblock signal corresponding to each macroblock of a plurality of macroblocks generated by dividing an input image signal; selecting a quantization code table corresponding to each macroblock from a plurality of quantization code tables; generating a predictive error signal for each of the encoding modes based on the macroblock signal and the predictive signal; subjecting the predictive error signal to orthogonal transformation; quantizing the orthogonal-transformed predictive error signal while changing a quantization parameter for every plural sub-pixel-blocks in the macroblock, using the quantization code table corresponding to the macroblock to generate a quantization transformation coefficient; encoding the quantization transformation coefficient; calculating an encoding cost from encoding distortion and number of encoded bits of the encoded quantization transformation coefficient; selecting one encoding mode from the encoding modes based on the encoding cost; selecting one quantization code table from the quantization code tables based on the encoding cost; and encoding information of an index indicating the selected quantization code table for every encoding part of the input image signal, the encoding part including one of a frame of the input image signal and a region of the frame.

BRIEF DESCRIPTION OF THE SEVERAL VIEWS OF THE DRAWING

FIG. 1 is a block diagram of an image encoding apparatus according to a first embodiment of the present invention;

FIG. 3 is a diagram for explaining a method of quantization/dequantization according to the above embodiment;

FIG. 4 is a diagram for explaining an outline of a syntax structure concerning the embodiment;

FIG. 5 is a diagram showing a data structure of a sequence header concerning the embodiment;

FIG. 6 is a diagram showing a data structure of a slice header concerning the embodiment;

FIG. 7 is a diagram showing a data structure of a macroblock layer concerning the embodiment;

FIG. 8 is a diagram showing a data structure of a slice header concerning the embodiment;

FIG. 9 is a diagram showing a data structure of a macroblock layer concerning the embodiment;

FIG. 10 is a diagram indicating a quantization code table index concerning the embodiment;

FIG. 12 is a diagram showing a data structure of a sequence header according to the second embodiment;

FIG. 13 is a diagram showing a data structure of a slice header according to the second embodiment;

FIG. 14 is a diagram showing a data structure of a macroblock header according to the second embodiment.

DETAILED DESCRIPTION OF THE INVENTION

Figure 2:
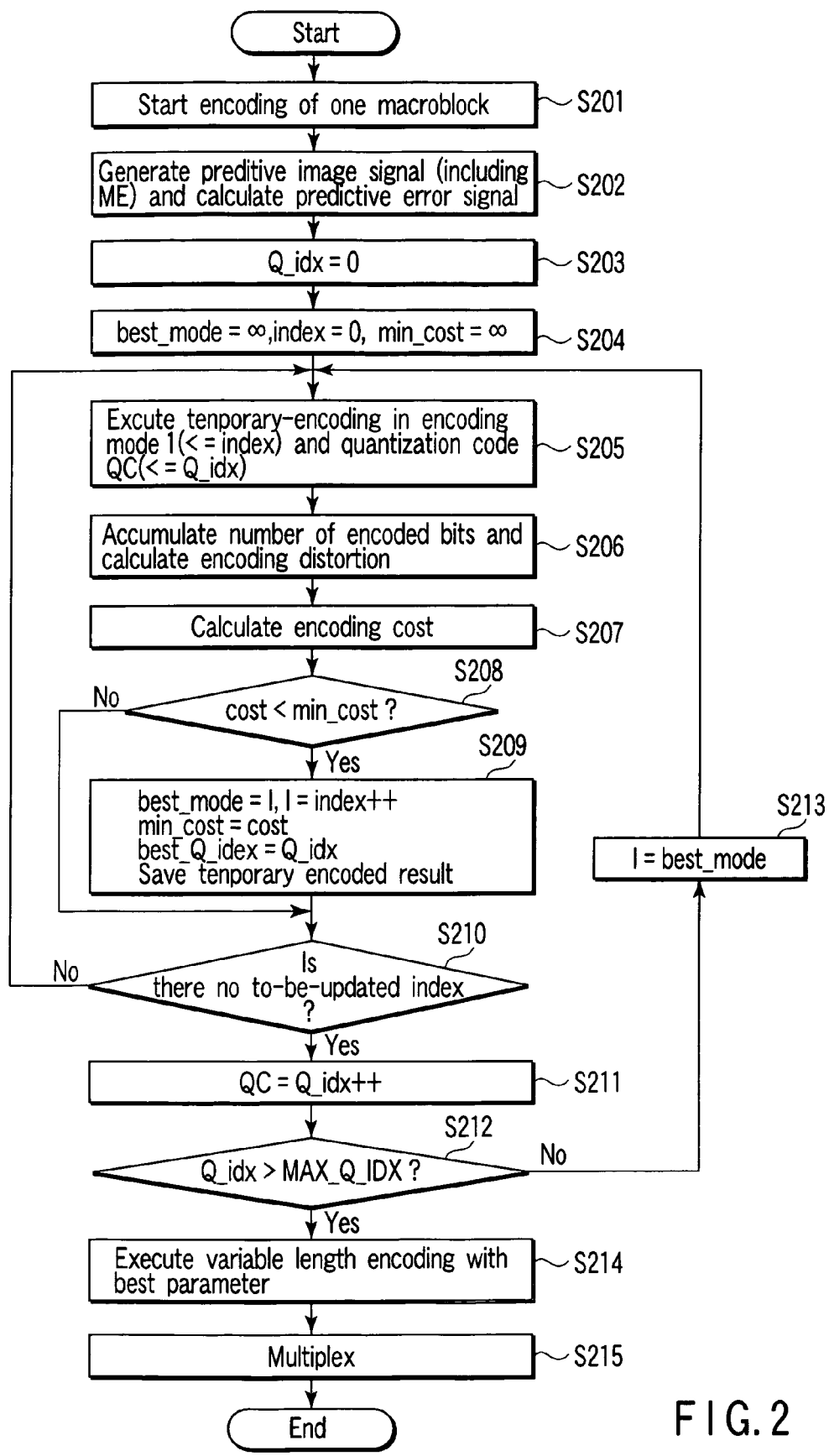
FIG. 2 is a process flow chart of a video encoding method implemented with the image encoding apparatus.

There will now be described an image encoding method, an image encoding apparatus, an image decoding method and an image decoding apparatus in conjunction with accompanying drawings hereinafter.

FIG. 1 is a block diagram of a video encoding apparatus related to the first embodiment of the present invention. In this embodiment, a video image is encoded by quantizing a predictive error signal referring to a quantization code table in units of a block smaller than a macroblock.

According to FIG. 1, an input image signal, that is, a video signal is divided into macroblocks or macroblock pairs and input to a video encoding apparatus 100. In the video encoding apparatus 100, a plurality of prediction modes different in block size or predictive signal generation method from each other are prepared as an intra prediction mode and an inter prediction mode. The predictive signal generator 120 generates a predictive image in all modes selectable by a macroblock of a reference image stored temporarily in a reference image memory 111. Further, the predictive signal generator 120 generates a predictive error signal obtained by subtracting the predictive signal from the input image signal.

If a designated mode is a motion compensation inter prediction mode, the predictive signal generator 120 carries out detection of a motion vector and selection of a reference image together. In other words, the predictive signal generator 120 comprises a motion compensated prediction module which detects a motion vector using a reference image of the reference image memory 111 to generate a motion compensated predictive signal, and a subtracter to subtract a predictive signal output by this motion compensated prediction circuit from the input image signal to generate a predictive error signal.

When next prediction cannot be carried out unless a local decoded image is produced in the macroblock likewise the intra prediction of H.264 (4*4 prediction), the intra prediction may be done with the orthogonal transformer 102 described below. The predictive signal is generated only with the predictive signal generator 120 and the orthogonal transformer 102.

The predictive error signal generated with the predictive signal generator 120 is input to the quantization set selector 101. The quantization set selector 101 selects a table from the quantization code tables used by the quantizer and dequantizer and sets it to an encoding controller 121.

The predictive error signal generated with the predictive signal generator 120 is sent to the orthogonal transformer 102 through the quantization set selector 101. The orthogonal transformer 102 subjects the predictive signal to orthogonal transformation (for example, discrete cosine transformation (DCT)) and supplies transformation coefficient to the quantizer 103.

The quantizer 103 refers to the quantization cord table set with the encoding controller 121 and quantizes the transformation coefficient according to the quantization code table, and outputs the quantized orthogonal transformation coefficient and prediction mode information (or motion vector information, reference image information) to a switch 104 and a dequantizer 108. In this embodiment, the quantizer 103 functions as a signal generating module to execute a video encoding method according to the set quantization cord table.

The quantized transformation coefficient is subjected to variable length encoding (VLC) along with information on the prediction method such as mode information, a quantization coefficient, a quantization code table, with a variable length encoder 112. This VLC information is multiplexing by a multiplexer 122 to be output as encoded data through an output buffer 123.

The dequantizer 108 dequantizes the quantized transformation coefficient from the quantizer 103 according to the quantization code table set with the encoding controller 121, and outputs the dequantized transformation coefficient to an inverse orthogonal transformer 109. The inverse orthogonal transformer 109 subjects the dequantized transformation coefficient to inverse orthogonal transformation (for example, inverse DCT), reconstructs it to the predictive error signal and outputs it to the prediction decoder 110.

The prediction decoder 110 processes the predictive error signal according to the process corresponding to the process of the predictive signal generator 120 to playback an image and outputs it to the reference image memory 111. The reference image memory 111 stores the reconstructed image. The image stored in the reference image memory 111 is referred to when a predictive error signal is generated with the predictive signal generator 120. In the video encoding apparatus, the predictive image is not generated with the prediction decoder 110, but a predictive signal generated by the motion compensated prediction circuit of the predictive signal generator 120 is desirably held and used.

The switch 104 outputs an orthogonal transformation coefficient and prediction mode information supplied from the quantizer 103 to a provisional encoder/number-of-encoded bits counter 105 or a variable length encoder 112.

The provisional encoder/number-of-encoded bits counter 105 provisionally encode a signal indicating the orthogonal transformation coefficient input via the switch 104 and counts the number of encoded bits. The provisionary encoding is to encode temporally the coefficient to count the number of encoded bits. The provisional encoder/number-of-encoded bits counter 105 is not output entropy coding data but counts only the number of encoded bits. The provisional encoder/number-of-encoded bits counter 105 counts the number of encoded bits of data encoded by Huffman encoding or entropy encoding based on arithmetic coding.

The number of encoded bits counted with the provisional encoder/number-of-encoded bits counter 105 is input to an encoding distortion detector 106. The encoding distortion detector 106 detects a squared error between the local decoded image from the prediction decoder 110 and the input image signal and outputs it to an encoding model control/determination unit 107 as an encoded distortion (quantization distortion). The encoding mode control/determination unit 107 calculates an encoding cost from input encoding distortion (quantization distortion) and the number of encoded bits. The mode of the macroblock is determined using the encoding cost as an index. More specifically, in the present embodiment, the cost obtained by the following equation (8) is used.

$$\text{Cost} = D + \lambda \times R \qquad (8)$$

D represents an encoding distortion and R represents the number of encoded bits. An encoding mode is selected from a plurality of encoding modes based on the encoding cost obtained in this way. In other words, a pixel block to-be-encoded is subjected to a prediction encoding, counting of the number-of-encoded bits and detecting of an encoding distortion for each of one or more encoding modes. The encoding costs each provided for every encoding mode are compared with each other to select one encoding mode.

In this embodiment, the encoding mode control/determination unit 107 selects an encoding mode of the lowest encoding cost. In other words, the process is carried out in order of the quantization set selector 101→the orthogonal transformer 102→the quantizer 103→the switch 104→the provisional encoder/number-of-encoded bits counter 105→the encoding distortion detector 106→the encoding model control/determination unit 107 in FIG. 1, to select an optimum encoding mode.

When the encoding mode is decided, the output terminal of the switch 104 is connected directly to the variable length encoder 112 to encode the input image signal by the selected encoding mode and quantization code table again, and output encoding information on the quantization transformation coefficient, the quantization code table, the encoding cost, etc., with the selected encoding mode. In this case, various information (indexes of quantized transformation coefficient and selected quantization code table) obtained when encoding the input image signal using the optimum encoding mode and the quantization code table are held beforehand. The held data may be output without encoding the input image signal with the variable length encoder 112 again.

In this time, when the provisional encoding loop (a process flow in order of the quantization set selector 101→the orthogonal transformer 102→the quantizer 103→the switch 104→the provisional encoding and the number-of-encoded bits counter 105→the encoding distortion detector 106→the encoding model control/determination unit 107 in FIG. 1) is carried out for all modes selectable for the macroblock, it is one time loop. In other words, the mode determination is completed when the first provisional encoding loop is ended, and thereafter it is not needed to determine a mode again.

The encoding mode selected with the first loop is set to the encoding controller 121. In the following loop, when the provisional encoding is done by changing the quantization code table, a predictive error signal calculated with an encoding mode set to the encoding controller 121 is used. Further, in the initial loop, the quantization and dequantization are carried out by a scheme in which quantization is changed in the macroblock for the purpose of suppressing influence of an encoding mode determination using the quantization table as much as possible.

In the intra prediction of H.264, the local decoded image of the current block is referred to as a reference image at the time of generation of the predictive picture to produce a predictive image of a block approximate the current block. Therefore, it is necessary to do orthogonal transformation, quantization and dequantization, and inverse orthogonal transformation for every small pixel block. Therefore, when the quantization code table is determined by the provisional encoding loop (provisional encoding loop on and after the second time), the intra prediction may be repeated to regenerate a predictive signal with the orthogonal transformer 102 or not.

The encoding controller 121 carries out feedback control of the number of encoded bits, quantizing characteristic control, mode control, rate control to control the number of encoded bits, control of the prediction unit, and the whole control of encoding.

The functions of the above configuration parts may be realized by a computer according to a program stored therein.

The above describes configuration of the video encoding apparatus 100 according to this embodiment. The video encoding method of the first embodiment related to the present invention will be described in conjunction with FIG. 2 as an example implemented by the video encoding apparatus 100.

When a video signal is input to the video encoding apparatus 100 for every frame, the input image is stared to be encoded for every macroblock or every pair of macroblocks (step S201).

The predictive image signal generation and predictive error signal calculation are done about all encoding modes selectable for the macroblock of the input video signal with the predictive signal generator 120 (step S202). The determination of the encoding mode and selection of the optimal quantization code table are determined by orthogonal-transforming and quantizing the predictive error signal obtained by the above process.

The index Q_idx indicating the quantization code table is initialized to 0 (step S203). This index represents the number of the cord table as shown in FIG. 10, for example. Further, the index indicating an encoding mode is initialized to 0, the index Best_Mode of the best encoding mode to be finally selected is initialized to the maximum, and Min_Cost indicating the minimum encoding cost is initialized to the maximum (step S204).

The provisional encoding is done in an encoding mode I (=index) and quantization code table index QC (=Q_idx). In other words, the output terminal of the switch 104 is connected to the provisional encoder/number of encoded bits counter 105 in provisional encoding. The provisional encoding process is carried out according to a provisional encoding loop shown in FIG. 1 (a process flow executed in order of the quantization set selector 101→the orthogonal transformer 102→the quantizer 103→the switch 104→the provision encoder/number-of-encoded bits counter 105→the encoding distortion detector 106→the encoding mode control/determination unit 107 in FIG. 1).

In the quantizer 103, quantization is done according to a value of a cord table shown by the quantization code table index QC. The quantization parameter is calculated from the quantization code table index QC according to the following equation (9).

$$QP_{blk} = QP + QV(QC, blk) \quad (9)$$

QP blk represents a sub-pixel-block quantization parameter derived from the quantization code table index QC, and QP indicates a quantization parameter of macroblock. QV (QC, blk) indicates a quantization code table shown in the quantization code table index QC and block number blk. These processes may be performed in units of 8*8 block or 4*4 block. For example, the quantization code table of 8*8 block is defined by the following equation (10).

$$QV(QC, blk) = \begin{bmatrix} v_{blk}^0 \\ v_{blk}^1 \\ M \\ v_{blk}^{QC} \\ M \\ v_{blk}^{Q\_MAX\_IDX} \end{bmatrix} = \begin{bmatrix} 0, 0, 0, 0 \\ 1, 1, -1, -1 \\ -1, -1, 1, 1 \\ 1, -1, 1, -1 \\ -1, 1, -1, 1 \\ M \end{bmatrix} \quad (10)$$

$v_{blk}^{QC}$ represents a variable of the quantization value in the block number. For example, −1 indicates quantization of 8*8 block to be objected by subjecting the quantization parameter of the macroblock to −1. It is possible to change the quantization parameter in the macroblock for every 8*8 pixels by designing a $v_{blk}^{QC}$ table suitable for the input image.

There are four 8*8 blocks in the macroblock. Therefore, blk contains values from 0 to 3. In the first provisional encoding loop, QC=0. In this time, the provisional encoding process is done by a conventional intra-macroblock fixed quantization parameter. FIG. 3 shows a method of assigning an intra-macroblock quantization parameter when a quantization code table $v_{blk}^{QC}$ is given.

The quantization parameter is changed using the parameter change degree corresponding to each position. When the quantization parameter is changed in units of 8*8 pixels, the 4*4 pixel block quantizer quantizes four blocks with the same quantization parameter as shown in FIG. 3 left side. In the case of the 8*8 pixel block quantizer, the quantization parameter is changed for every block as shown in the FIG. 3 right side.

Conventionally an encoding cost used for the provisional encoding is defined based on the assumption that the quantization parameter in the macroblock does not fluctuate. Therefore, the following conditional expression (11) should be added to the equation (10).

$$\sum_{blk} v_{blk}^{QC} = 0 \quad (11)$$

This represents that the fluctuation of the quantization parameter in the macroblock is constant qualitatively, and a restriction condition to be necessary for cost evaluation in encoding cost computation.

The cumulative addition of the number of encoded bits are done with the provisional encoder/number of encoded bits counter 105. The encoding distortion is calculated from the input image and the local decoded image with the encoding distortion detector 106 (S206). The transformation coefficient quantized with the quantizer 103 is dequantized with the dequantizer 108, and then is subjected to inverse orthogonal transformation with the inverse orthogonal transformer 109, whereby the predictive error signal is decoded. Further, the predictive error signal is added to the predictive signal.

The encoding cost is calculated from the number of encoded bits and encoding distortion according to the equation (8) (S207). However, the number of encoded bits may be used as the encoding cost without using the encoding distortion. In this case, the encoding distortion is not needed for determination of the encoding mode. Therefore, a large load process such as dequantization and inverse orthogonal transformation is not needed in the provisional encoding loop. Alternatively, the statistic of the input image (for example, a DC value of the input image (sum of differences between the pixels and the DC value) may be used instead of the encoding distortion. The provisional encoding does not read out the encoded data.

The encoding mode control/determination unit 107 determines whether the calculated encoding cost is less than the minimum encoding cost min_cost (step S208). When the determination is YES, the encoding mode control/determination unit 107 updates the encoding cost to the minimum encoding cost and saves the encoding mode of the provisional encoding as a best_mode and the quantization code table index as best_Q_idx. Further, the index value is incremented by one. In this case, various encoded data obtained when encoding is done with the best encoding mode are held to avoid a re-encoding process (S209).

The encoding mode control/determination unit 107 determines whether the updated index is more than MAX_INDEX (step S210). When the index is more than MAX_INDEX, that is, all process of the selectable encoding modes in the macroblock selected in step S209 are ended, the determination is YES. In other words, the process to steps S205-S210 is completed about all encoding modes. When the determination is NO, the process of steps S205-S210 is done in a mode shown in the updated index. In this way, when the determination in step S210 is YES, the encoding mode that the encoding cost is minimum is determined from among the selectable encoding modes in the macroblock. When the determination in step S210 is YES, the quantization code table index Q_idx is incremented to update QC (S211).

The encoding mode control/determination unit 107 determines whether the updated Q_idx is more than MAX_Q_IDX (step S212). When Q_idx is larger, the provisional encoding process is completed about all selectable quantization code table indexes. When the determination is NO, the process is shifted from the encoding mode control/determination unit 107 to the quantization set selector 101 to repeat the provisional encoding loop with a new Q_idx. If the encoding mode I=best_mode, the quantization code table index loop (from step S205 to step S212) is executed in best_mode determined in the first loop without repeating the mode determination again.

When the determination in step S212 is YES, the provisional encoding loop is ended, and the quantization is done using best_mode and best_Q_idx again, and the encoding is done with the variable length encoder 112 (step S214). When data of this time are held, re-encoding is not needed. Accordingly, the encoded data are just output to the multiplexer 122 and multiplexed according to each system and then output to the output buffer 123 as bit stream data (S215).

The quantization code table selected for every pixel block is an appropriate quantization code table selected from a plurality of quantization code tables. It is converted into a quantization code table index according to a selected cord table, and encoded. The quantization code table can be changed in units of one region (referred to as a slice) composed of a plurality of pixel blocks in frame. The quantization set selector 101 selects a quantization code table of high encoding efficiency for every slice. The information of the selected quantization code table is multiplexed with the encoded data as an index of the quantization code table.

The quantization code table may be configured to have a configuration uniquely determined automatically according to a quantization parameter and target bit rate. For example, when the quantization parameter is smaller than a value, a quantization code table index having a small value is selected, whereas when it is larger than the value, the index having a large value is selected. Alternatively, when a bit rate is higher than a value, a quantization code table index having a large value is selected, whereas when it is lower than the value, the index having a small value is selected. In each case, the same quantization code table is selected in decoding encoded data, converted into a corresponding quantization code table, and dequantized.

There will be explained an encoding method of quantization code table index information. FIG. 4 shows an outline of structure of a syntax used in this embodiment. The syntax comprises three parts. The high level syntax (401) contains syntax information of higher layers than the slice.

The slice level syntax (404) specifies information to be necessary for every slice. The macroblock level syntax (407) specifies an error signal and mode information that are subjected to variable length encoding and needed for every macroblock.

Each syntax is composed of further detailed syntaxes. That is, the high level syntax (401) comprises a sequence of sequence parameter set syntax (402), picture parameter set syntax (403), etc., and a syntax of a picture level. The slice level syntax (404) is composed of a slice header syntax (405) and a slice data syntax (406). The macroblock level syntax (407) is composed of a macroblock layer syntax (408) and a macroblock prediction syntax (409).

According to the present embodiment, necessary syntax information is a sequence header (402), a slice header (405) and a macroblock header (408), which are described hereinafter.

An ex_quant_code_in_slice_flag shown in the sequence header of FIG. 5 is a flag indicating whether the quantization code table index is encoded for every slice. When this flag is 1, the quantization code table index can be changed for every slice. An ex_quant_code_in_mb_flag is a flag indicating whether the quantization code table index is encoded for every macroblock. When this flag is 1, the encoder can change the macroblock quantization code table index for every macroblock.

A slice_ex_code_zero_flag is encoded in a slice header of FIG. 6 when ex_quant_code_in_slice_flag shown in FIG. 5 is 1. This flag shows that the selected quantization code table index is 0. This flag indicates that conventional quantization is selected in the current slice when the flag is 1. In other words, it indicates that the quantization parameters are equal in the macroblock. Then, rem_slice_ex_code_num is not encoded. When the slice_ex_code_zero_flag is 1, the currently selected quantization code table index QC is encoded as a value of the following equation (12).

$$\text{rem\_slice\_ex\_code\_num} = QC - 1 \qquad (12)$$

Similarly, a mb_ex_code_zero_flag is encoded in the macroblock header of FIG. 7, when an ex_quant_code_in_mb_flag shown in FIG. 5 is 1. This flag indicates that the selected quantization code table index is 0. This flag indicates that conventional quantization is selected in the current macroblock, when the flag is 1. In other words, it is shown that quantization parameters are equal in the macroblock. Then, the rem_mb_ex_code_num is not encoded. When the mb_ex_code_zero_flag is 1, the currently selected quantization code table index QC is encoded as a value of the following equation (13).

$$\text{rem\_mb\_ex\_code\_num} = QC - 1 \qquad (13)$$

When this is really encoded, it is designed so that the number of encoded bits when $v_{blk}^{QC} = \{0,0,0,0\}$ is selected is decreased. Such a syntax aims at decreasing the number of encoded bits as small as possible when the effect due to the quantization code table index is low in a low bit rate.

The following syntax is thought as another example of the syntax. FIG. 8 shows a part of a data structure of a slice header and FIG. 9 shows a part of a data structure according to a macroblock layer. The quantization code table indexes of the slice header and the macroblock layer are subjected to variable length encoding as it is or to fixed length encoding and multiplexed.

Particularly the intra prediction performs prediction using spatial correlation of the input image, so that the distribution of coefficients is apt to differ greatly in a fine region in the macroblock. In such a case, the quantizer in which a quantization parameter is not changed in the macroblock is not almost selected. If the quantization is done using various quantization code table indexes, the number of encoded bits may be decreased. In other words, since occurrence frequency of quantization code table indexes cannot be predicted, it is difficult to configure syntax of high efficiency. Therefore, there is the case that the syntaxes shown in FIGS. 8 and 9 are effective.

As discussed above, in this embodiment, a provisional encoding process is really done for each of a plurality of selectable encoding modes. The encoding mode of the lowest encoding cost is selected from a plurality of encoding modes each having an encoding cost calculated from the number of encoded bits and encoding distortion of the encoded data. A provisional encoding process is carried out as a quantization code table loop based on the selected mode again. The encoded data encoded according to the quantization code table index that the encoding cost is minimum is output.

In this way, the encoding mode is selected by controlling the quantization parameter in the macroblock for every sub-block using a quantization code table. Therefore, it is possible to select a quantization parameter by which encoding can be done at high encoding rate according to a prediction block shape and a prediction method. The conventional mode determination system can be used as it is by suppressing an average variation value of the quantization parameter in the macroblock.

As thus described, it is not necessary for all encoding modes to do an encoding process with a heavy load. Since the encoding has only to be done at the selected encoding mode, an operation load can be decreased. In other words, in this embodiment, it is possible to realize a high speed and preferable encoding mode selection and a video encoding of high speed and high compression efficiency.

As mentioned earlier, in the case of performing encoding in a selected mode, a quantized orthogonal transformation coefficient of a predictive error signal is input to an inverse orthogonal transformer/dequantizer 206 and subjected to inverse quantization and inverse orthogonal transformation to reproduce a predictive error signal. A local decode image is generated by a prediction decoder 207, and is temporarily stored in a reference image memory 208 as a reference image. These local decode image generation processes have only to be done only for the selected mode, and needs not to be always executed in a loop for determining a prediction mode.

A video encoding method of another example is explained. Where the maximum Q_MAX_IDX of the quantization code table index has a larger value than a given value, the number of encoded bits of the syntax to be encoded cannot be ignored particularly at the low bit rate. Therefore, when the syntax is sent for every macroblock, eight ways (3 bits) are proper for a practical range. On the other hand, in the case of a higher bit rate, the encoding efficiency should be improved by a quantization code table index of a high effect. Therefore, the quantization code table is changed according to a quantization parameter as a base.

The value of the quantization parameter QP is controlled according to the rate control done by the encoding controller 121. When a to-be-encoded macroblock is encoded, the value of the quantization parameter is already determined, and conventionally the encoder encodes a differential value between the quantization parameters. In a provisional encoding loop, a quantization code table to be used is changed according to the value of the given quantization parameter QP.

More concretely, when the quantization parameter QP is smaller than a certain value QPLow, a table wherein Q_MAX_IDX is large is employed. When QP is larger than QPHigh, the table wherein Q_MAX_IDX is small is used. Since the quantization code table which is easy to be chosen according to the bit rate exists, a table used according to the value of the quantization parameter is changed adaptively.

As another example, there may be used a system wherein a table of Q_MAX_IDX is prepared, and a provisional encoding loop is executed in the allowable range of the bit designated from the top of the table according to the value of the quantization parameter.

FIG. 10 illustrates an example of a 8*8 pixel block quantization cord table index. The index available according to a value of the quantization parameter QP of the macroblock given by rate control is changed. For example, when QP is larger than 32, eight quantization code table indexes (a rem_mb_ex_code_zero_flag is configured by 3 bits) can be selected. On the other hand, in the case that QP is in a range to 20-32, sixteen quantization code table indexes (a rem_mb_ex_code_zero_flag is configured by 4 bits) can be selected.

In other words, the number of bits used for every macroblock changes a bit length usable according to an effective range of QP. When the quantization parameter has a large value, the coefficient is quantized coarsely to make the encoded data small. If the large number of bits are used for the small encoded data for every macroblock, the number of encoded bits cannot be decreased for the whole of the image to be encoded. For this reason, it is decided what bits are available according to a range of the quantization parameter. If the decided number of bits are input to the encoder and decoder, the number of bits of the syntax to be actually sent according to the bit rate to be used can be adjusted. It is possible to improve the encoding efficiency by changing a table selectable according to the quantization parameter. QP in this way to suppress the overhead of the syntax.

A video encoding method according to the second embodiment will be described.

In this embodiment, a step for selecting a corresponding quantization matrix corresponding for every pixel block is added to the first embodiment. In other words, this embodiment includes switching selectively a plurality of quantization matrices as well as determining an index representing a quantization parameter of a quantization code table. The configuration of a video encoding apparatus of the embodiment is similar to FIG. 1. In the second embodiment, like reference numerals are used to designate like structural elements corresponding to those like in the first embodiment and any further explanation is omitted for brevity's sake.

Figure 11:
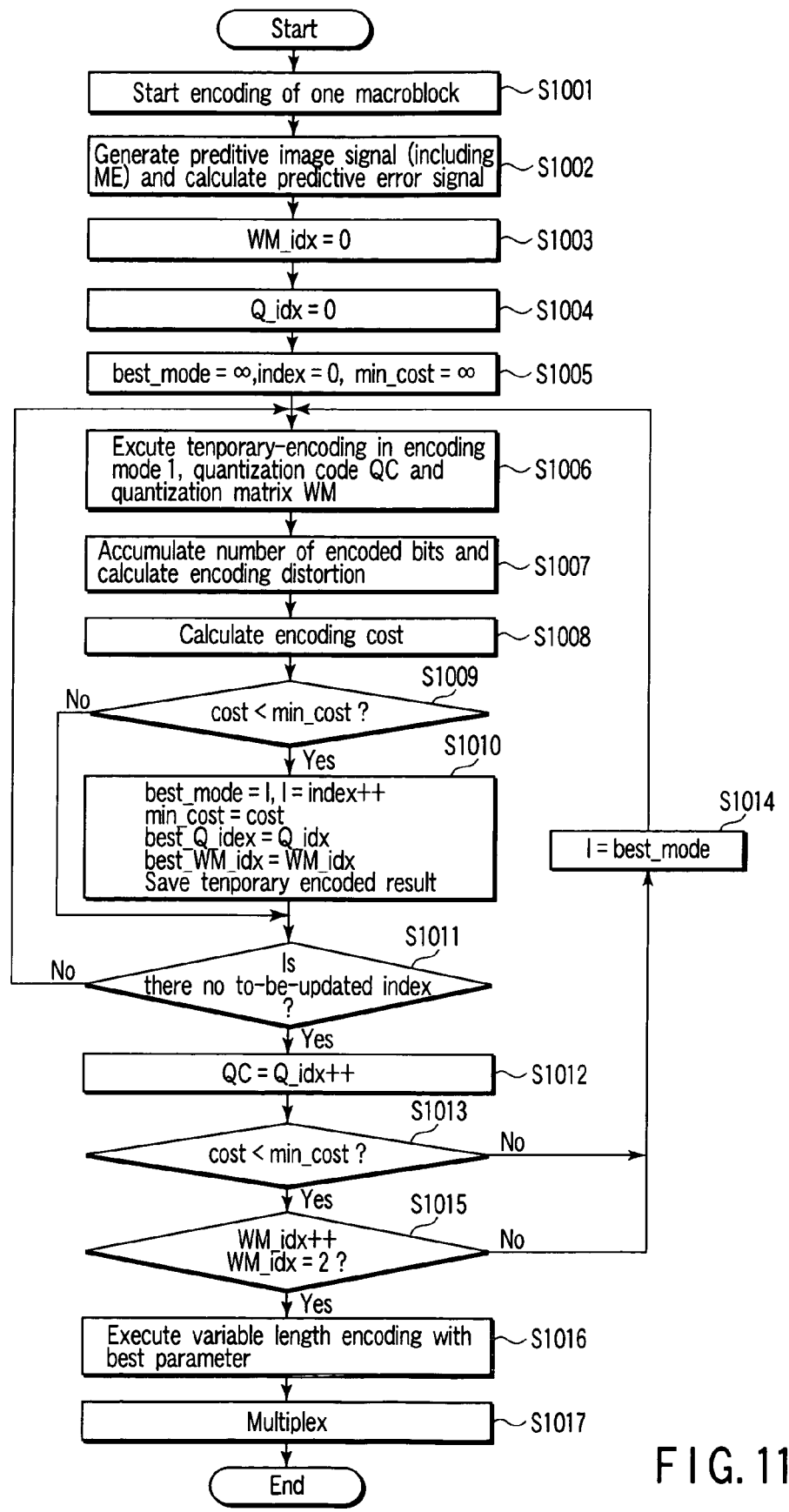
FIG. 11 is a process flow chart of the image encoding method according to a second embodiment.

FIG. 11 shows a process flow of video encoding of this embodiment. Steps S1001 and S1002 are equal with steps S201 and S202 of FIG. 2, respectively. The encoding controller 121 initializes an index WM_idx indicating a table number of a quantization matrix to 0 (step S1003). Further, each variable is initialized (steps S1004 and S1005). Similarly to the first embodiment, a provisional encoding loop (a process executed in order of the quantization set selector 101→the orthogonal transformer 102→the quantizer 103→the switch 104→the provisional encoding and the number-of-encoded bits counter 105→the encoding distortion measurement unit 106→the encoding mode control/determination unit 107 in FIG. 1) is repeated to determine the encoding mode I and the quantization code table index QC (steps S1005-S1013).

In the provisional encoding loop till determining the encoding mode and quantization code table index, flat quantization and dequantization are carried out without the use of the quantization matrix. The flat quantization is quantization that all components of the quantization matrix expressed by the equation (7) indicate 16. In H.264, when the quantization matrix is not used, the flat quantization is carried out.

When determination in step S1013 is YES, the quantization set selector 101 increments WM_idx, and sets the result to the encoding controller 121. It is determined whether WM_idx is equal to 21. When the determination is NO, the encoding mode is updated (step S1014), and the provisional encoding is carried out according to the updated quantization matrix index again. When the encoding cost "cost" provided by the provisional encoding is smaller than min_cost, the best_WM_idx is updated, and the provisional encoding result is stored (step S1010).

If the determination is YES, the provisional encoding loop is ended, and the encoding is done using various parameters determined with the provisional encoding loop again (step S1016). If data obtained by the provisional encoding are saved, re-encoding is not needed. Therefore, the encoded data is just output to the multiplexer 122. The encoded data are multiplexing according to each scheme and output to the output buffer 123 as bit stream data (S215).

In this embodiment, WM_idx is assumed to be a value of the following index. If the WM_idx is 0, the flat quantization is done. If the WM_idx is 1, the quantization matrix prescribed in H.264 is applied to the macroblock to be objected. In the case that a default matrix is used, according to the present scheme, the default matrix and the flat matrix can be selected for every macroblock. The default matrix and flat matrix in the 4*4 pixel block of H.264 (without using the quantization matrix) are expressed by the following equation (14).

$$WS_{default}(i, j) = \begin{bmatrix} 6 & 12 & 20 & 27 \\ 12 & 20 & 27 & 32 \\ 20 & 27 & 32 & 37 \\ 27 & 32 & 37 & 41 \end{bmatrix}, \quad (14)$$

$$WS_{flat}(i, j) = \begin{bmatrix} 16 & 16 & 16 & 16 \\ 16 & 16 & 16 & 16 \\ 16 & 16 & 16 & 16 \\ 16 & 16 & 16 & 16 \end{bmatrix}$$

There will be explained a method of encoding an index of quantization matrix.

FIG. 12 shows a part of data structure of a sequence header, FIG. 13 shows a part of data structure of a slice header, and FIG. 14 shows a part of data structure of a macroblock header. These are defined similarly to the syntax structure of FIG. 4.

The ex_quant_matrix_in_slice_flag shown in FIG. 12 is a flag indicating whether the index of quantization matrix is encoded for every slice. The ex_quant_matrix_in_mb_flag is a flag indicating whether the index of quantization matrix is encoded for every macroblock. The slice_ex_matrix_flag is a flag indicating whether the quantization matrix is used in the slice. If the slice_ex_matrix_flag is 1, the corresponding quantization matrix is used. In this case, the quantization matrix may be sent, and the default matrix existing in the H.264 High profile may be employed. The flag "0" means that the quantization matrix is not employed in the slice. Similarly, the mb_ex_matrix_flag is a flag indicating whether the quantization matrix is used in the corresponding macroblock. If the flag is 1, quantization is carried out using the quantization matrix.

An index of the corresponding quantization matrix rather than a flag indicated by 1 bit as shown in FIGS. 12 and 13 are sent as it is, and quantization/dequantization may be done using a plurality of quantization matrices. Then, the encoder and decoder must have quantization matrix tables corresponding to indexes of respective quantization matrices (alternatively send the quantization matrices with multiplexing it to the encoded data).

The intra frame encoding can improve encoding efficiency in comparison with the inter-frame encoding by controlling finely a parameter related to quantization (quantization parameter, quantization code table, quantization matrix, quantization offset, etc.). The above encoding scheme can be applied to only the intra-frame encoding region. In this case, when inter-frame encoding information is derived from the encoding controller 121 (FIG. 1), the quantization set selector 101 sets each of the quantization code table index and the quantization matrix index to 0. YES is always selected in step S212. Similarly, step S1015 always selects YES, too.

In other words, in the inter-frame encoding block, the quantization code table index loop and quantization matrix index loop are not executed. Further, because only the index "0" can be selected from the quantization code table index and quantization matrix index, it is not necessary to send the syntax, too. In this way, the processing load and encoding efficiency can be improved by encoding only the intra-frame encoding region using a parameter related to each quantization without applying to the inter-frame encoding region.

As discussed above in this embodiment, a provisional encoding process is really done about a plurality of selectable encoding modes. An encoding cost is calculated from the number of encoded bits and encoding distortion of the encoded data for every mode to obtain a plurality of encoding costs corresponding to the encoding modes. The minimum encoding cost is selected from the encoding costs. An encoding mode corresponding to the minimum encoding cost is selected from the encoding modes. The provisional encoding process is carried out according to a quantization code table loop based on a selected mode again to select the quantization code table that the encoding cost is minimum. The provisional encoding process is carried out according to a quantization matrix loop based on the selected encoding mode and quantization code table again to select the quantization matrix index that the encoding cost is minimum. The encoding is done using these parameters on quantization again to output encoded data. As thus described a quantization parameter in the macroblock is controlled for every small block using the quantization code table to select a mode, and further encoding is carried out by switching the quantization matrices for every macroblock, adaptively. As a result, encoding can be done at high encoding efficiency according to a predictive block shape and a prediction method. In other words, a preferable quantization can be performed according to contents of a pixel block.

Figure 15:
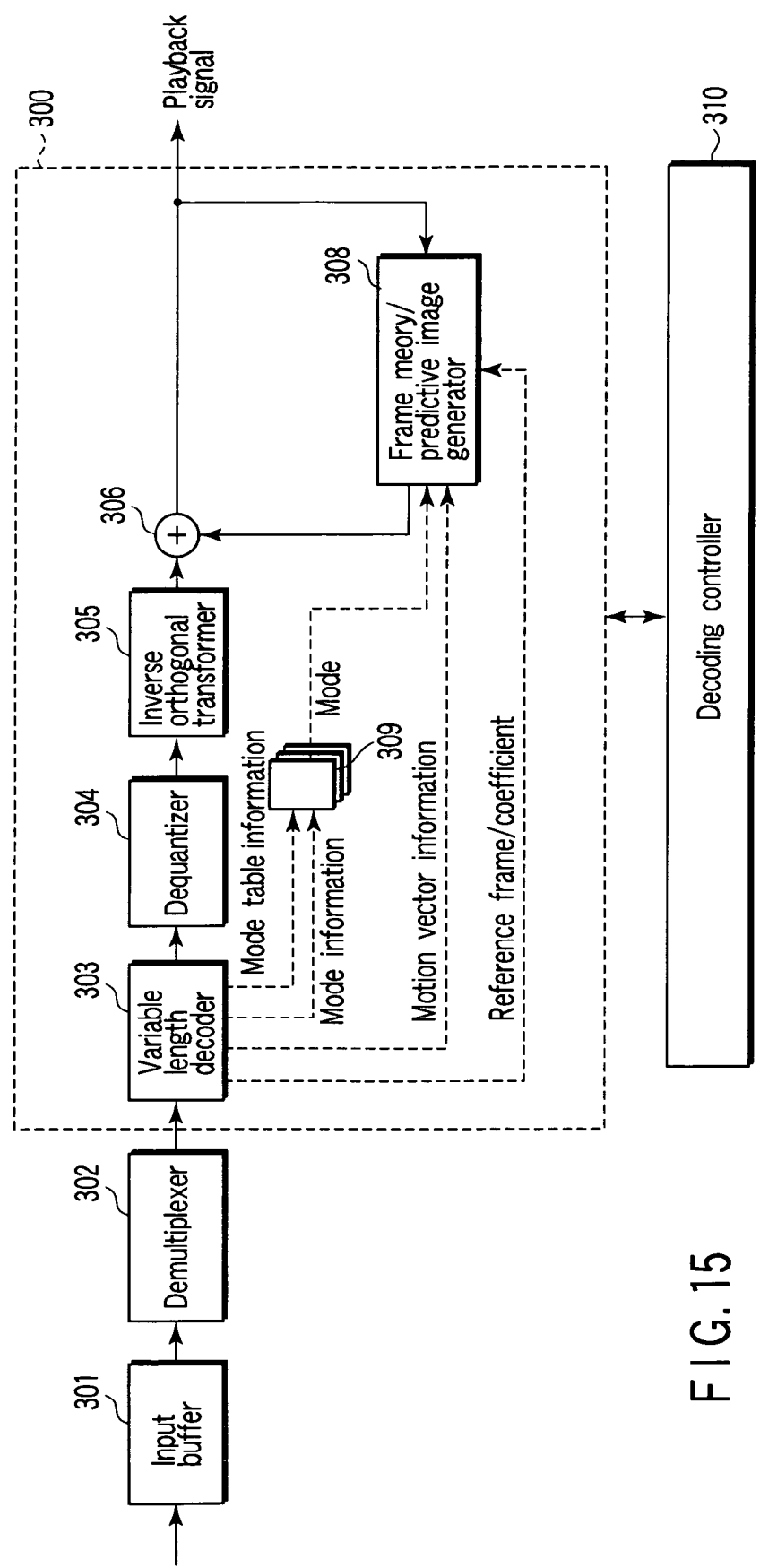
FIG. 15 is a block diagram of an image decoding apparatus according to the embodiment of the present invention.

FIG. 15 shows configuration of a video decoding apparatus 300 related to this embodiment. The encoded data sent out from the video encoding apparatus 100 via a transmission system or an accumulation system is temporally stored in an input buffer 301, and divided into a plurality of frames based on syntax by the demultiplexer 302, and then is input to a variable length decoder 303. The variable length decoder 303 decodes the variable-length code of each syntax of the encoded data to reproduce a quantization transformation coefficient, a quantization matrix, a quantization parameter, quantization code table information, mode information, and motion vector information.

The quantized transformation coefficient is dequantized with the dequantizer 304 and subjected to inverse orthogonal transformation with an inverse orthogonal transformer 305, using a quantization matrix, a quantization parameter, quantization code table information among reproduced information. When the mode information indicates an intra-encoding mode, a reproduced image signal is output from the inverse orthogonal transformer 305, and output as a final playback image signal 310 via an adder 306.

When the mode information indicates an inter-encoding mode, a predictive error signal is output from the inverse orthogonal transformer 305, and further the mode selection switch 309 is turned on. The predictive error signal and the predictive image signal output from a frame memory/predictive image generator 308 are added with the adder 306 to produce a playback image signal. The playback image signal is stored in the frame memory/predictive image generator 308 as a reference image signal.

The mode information and motion vector information are input to the frame memory/predictive image generator 308. The mode information is input to the mode selection switch 309, too. The switch 309 is turned off in the intra encoding mode and turned on in the inter-encoding mode.

The variable-length decoder 303 subjects demultiplexed encoded data to variable length decoding according to each scheme of the encoded data to obtain information required for decoding. The syntax in this embodiment is schematically shown in FIG. 4. The syntax is composed of three parts mainly. The high level syntax (401) is filled with syntax information of higher layers than the slice. The slice level syntax (404) specifies information to be necessary for every slice. The macroblock level syntax (407) specifies an error signal and mode information required for every macroblock.

Each of the syntaxes is composed of further detailed syntax. That is, the high level syntax (401) comprises a sequence of sequence parameter set syntax (402), picture parameter set syntax (403), etc., and a syntax of a picture level. The slice level syntax (404) is composed of a slice header syntax (405) and a slice data syntax (406). The macroblock level syntax (407) is composed of a macroblock layer syntax (408) and a macroblock prediction syntax (409). According to the present embodiment, necessary syntax information is a sequence header (402), a slice header (405) and a macroblock header (408), which are described hereinafter.

The ex_quant_code_in_slice_flag shown in the sequence header of FIG. 5 is a flag indicating whether the quantization code table index is decoded for every slice. When this flag is 1, the quantization code table index is changed for every slice and decoded. The ex_quant_code_in_mb_flag is a flag indicating whether the quantization code table index is decoded for every macroblock. When this flag is 1, the decoder changes the macroblock quantization code table index for every macroblock and decodes it.

The slice_ex_code_zero_flag is decoded in a slice header of FIG. 6 when the ex_quant_code_in_slice_flag shown in FIG. 5 is 1. This flag indicates that the selected quantization code table index is 0. This flag indicates that conventional quantization is selected in the current slice when the flag is 1. In other words, it indicates that the quantization parameters are equal in the macroblock. In this time, the rem_slice_ex_code_num is not encoded. When the slice_ex_code_zero_flag is 1, the currently selected quantization code table index QC is encoded as a value of the following equation (15).

$$\text{rem\_slice\_ex\_code\_num} = QC - 1 \quad (15)$$

Similarly, a mb_ex_code_zero_flag is decoded in the macroblock header of FIG. 7, when an ex_quant_code_in_mb_flag shown in FIG. 5 is 1. This flag indicates that the selected quantization code table index is 0. This flag indicates that conventional quantization is selected in the current macroblock, when the flag is 1. In other words, it is shown that quantization parameters are equal in the macroblock. Then, the rem_mb_ex_code_num is not decoded. When the mb_ex_code_zero_flag is 1, the currently selected quantization code table index QC is decoded as a value of the following equation (16).

$$\text{rem\_mb\_ex\_code\_num} = QC - 1 \quad (16)$$

The information derived from the sequence header, the slice header, the macroblock header, etc. is set to the decoding controller 310 and used for the following signal processing mode.

The following syntax is considered as another example of the syntax. FIG. 8 shows a part of the data structure of the slice header, and FIG. 9 shows a part of the data structure of the macroblock layer. The quantization code table indexes of the slice header and the macroblock layer are subjected to variable length decoding as it is or to fixed length decoding.

The dequantizer 304 accesses the quantization code table of the current macroblock from the quantization code table index, using the variable-length-decoded quantization code table information, sets a quantization parameter of a small pixel block for every corresponding pixel block, and dequantizes according to the equation (3).

The detailed description of this dequantization is described hereinafter.

The quantization parameter is calculated according to the following equation (17) equal to the equation (9) using the index QC indicating the quantization code table decoded with the variable-length decoder 303.

$$QP_{blk} = QP + QV(QC, blk) \quad (17)$$

QP blk represents a sub-pixel block quantization parameter derived from the quantization code table index, and QP indicates a quantization parameter of the macroblock. The value of QP can be obtained by subjecting the macroblock header to variable length decoding. QV (QC, blk) indicates a quantization code represented by the quantization code table index QC and the block number blk. These processes may be carried out in units of an 8*8 block or a 4*4 block. For example, the quantization code table of the 8*8 block is defined by the following equation (18) equal to the equation (10).

$$QV(QC, blk) = \begin{bmatrix} v_{blk}^0 \\ v_{blk}^1 \\ M \\ v_{blk}^{QC} \\ M \\ v_{blk}^{Q\_MAX\_IDX} \end{bmatrix} = \begin{bmatrix} 0, 0, 0, 0 \\ 1, 1, -1, -1 \\ -1, -1, 1, 1 \\ 1, -1, 1, -1 \\ -1, 1, -1, 1 \\ M \end{bmatrix} \quad (18)$$

where $v_{blk}^{QC}$ represents a variable of the quantization value in the block number. For example, −1 indicates dequantization of the 8*8 block to be objected by subjecting the quantization parameter of the macroblock to −1. The macroblock has four 8*8 blocks. Therefore, blk represents four values from 0 to 3.

FIG. 3 illustrates an assignment method of an intra-macroblock quantization parameter when the quantization code table is provided. The quantization parameter is changed using a parameter change degree corresponding to each position of the block. When the quantization parameter is changed in units of 8*8 pixels, the 4*4 pixel block quantizer dequantizes four blocks with the same quantization parameter as shown in FIG. 3 left side. The 8*8 pixel block quantizer changes a quantization parameter for every block as shown in the FIG. 3 right side.

There will be explained a decoding method for decoding an index of quantization matrix. FIG. 12 shows a part of the data structure of the sequence header, FIG. 13 shows a part of the data structure of the slice header, and FIG. 14 shows a part of the data structure of the macroblock header. These are defined like the syntax structure of FIG. 4.

The ex_quant_matrix_in_slice_flag shown in FIG. 12 is a flag indicating whether an index of the quantization matrix is decoded for every slice. The ex_quant_matrix_in_mb_flag is a flag indicating whether an index of the quantization matrix is decoded for every macroblock. The slice_ex_matrix_flag is a flag indicating whether the quantization matrix is used in the slice. If the slice_ex_matrix_flag is 1, the corresponding quantization matrix is used. In this case, the quantization matrix may be received, and such a default matrix as to exist in the H.264 High profile may be used.

If the slice_ex_matrix_flag is 0, it means that the quantization matrix is not used in the slice at the time of dequantization. Similarly, the mb_ex_matrix_flag is a flag indicating whether the quantization matrix is used in corresponding macroblock. If the flag is 1, dequantization is done using the quantization matrix.

An index of the corresponding quantization matrix rather than a flag indicated by 1 bit as shown in FIGS. 12 and 13 are sent as it is, and quantization/dequantization may be done using a plurality of quantization matrices. Then, the decoder must have quantization matrix tables corresponding to the indexes of respective quantization matrices (alternatively decode the quantization matrices from the encoded data).

How to switch the quantization matrix is described hereinafter.

When the slice_ex_matrix_flag of the slice header or the mb_ex_matrix_flag of the macroblock header is 0, the quantization matrix is not employed in the corresponding slice or macroblock (in other words, the flat dequantization is done). When the slice_ex_matrix_flag of the slice header or the mb_ex_matrix_flag of the macroblock header is 1, the dequantization is done in the corresponding slice or macroblock, using the sent quantization matrix or default matrix.

Where the default matrix is used, the default matrix and the flat matrix are selected for every slice or macroblock in this scheme. The default matrix and the flat matrix (corresponding to a case without the quantization matrix) in the 4*4 pixel block of H.264 are expressed by the following equation (19).

$$WS_{default}(i, j) = \begin{bmatrix} 6 & 12 & 20 & 27 \\ 12 & 20 & 27 & 32 \\ 20 & 27 & 32 & 37 \\ 27 & 32 & 37 & 41 \end{bmatrix}, \quad (19)$$

$$WS_{flat}(i, j) = \begin{bmatrix} 16 & 16 & 16 & 16 \\ 16 & 16 & 16 & 16 \\ 16 & 16 & 16 & 16 \\ 16 & 16 & 16 & 16 \end{bmatrix}$$

If the present scheme is used as thus described, when the dequantization of the equation (3) is done, the quantization matrx of the equation (4) can be changed for every slice or macroblock. Therefore, the dequantization is done in consideration of a subjective image quality.

As thus described, the dequantizer 304 carries out dequantization, using a system similar to the quantization done with the video encoding apparatus.

The above embodiments are explained as video encoding. However, the present invention can apply to still image encoding.

According to the present invention, by adjusting a value of a quantization parameter for every small pixel block, using the quantization code table for changing a quantization parameter in a macroblock, and performing quantization and dequantizaion changing the quantization matrix for every region, a dequantizer and dequantizer can be realized with maintaining higher encoding efficiency than the conventional dequantizer and considering a visual property.

According to the present invention, a quantizer and dequantizer while improving the encoding efficiency and considering visual property enough can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image encoding method for encoding an image signal according to an encoding mode, comprising:
   generating a predictive signal and encoding mode information according to each of a plurality of encoding modes from a macroblock signal corresponding to each macroblock of a plurality of macroblocks generated by dividing an input image signal;
   selecting a quantization code table corresponding to each macroblock from a plurality of quantization code tables;
   generating a predictive error signal for each of the encoding modes based on the macroblock signal and the predictive signal;
   subjecting the predictive error signal to orthogonal transformation;
   quantizing the orthogonal-transformed predictive error signal while changing a quantization parameter for every plural sub-pixel-blocks in the macroblock, using the quantization code table corresponding to the macroblock to generate a quantization transformation coefficient;
   encoding the quantization transformation coefficient;
   calculating an encoding cost from encoding distortion and number of encoded bits of the encoded quantization transformation coefficient;
   selecting one encoding mode from the encoding modes based on the encoding cost;
   selecting one quantization code table from the quantization code tables based on the encoding cost; and
   encoding information of an index indicating the selected quantization code table for every encoding part of the input image signal, the encoding part including one of a frame of the input image signal and a region of the frame.

2. The video encoding method according to claim 1, further comprising switching execution of quantization and dequantization using the quantization table between intra encoding and inter encoding.

3. The video encoding method according to claim 1, further comprising changing the quantization code table according to a value of the quantization parameter of the macroblock.

4. The video encoding method according to claim 1, further comprising selecting a quantization matrix corresponding to each macroblock, quantizing the orthogonal-transformed predictive error signal using the quantization matrix to generate a quantized transformation coefficient, and selecting one quantization matrix from a plurality of quantization matrices based on the encoding cost calculated from this quantized transformation coefficient.

5. The video encoding method according to claim 4, further comprising switching execution of quantization and dequantization using the quantization table between intra encoding and inter encoding.

6. The video encoding method according to claim 4, further comprising changing the quantization code table according to a value of the quantization parameter of the macroblock.

7. An image decoding method for decoding an encoded image signal, comprising:
receiving an index of a quantization code table for each macroblock of an encoded image signal;
dequantizing the macroblock while changing a quantization parameter according to the quantization code table corresponding to the index for every plural sub-pixel-blocks in the macroblock; and
changing the quantization code table for every image of the encoded image signal, the image including one of a frame of the encoded image signal and a region of the frame.

8. The image decoding method according to claim 7, further comprising receiving an index indicating one of the quantization code table and the quantization matrix table for every image of the encoded image signal, and decoding the macroblock with switching execution and non-execution of dequantization using one of the quantization code table and the quantization matrix table.

9. The image decoding method according to claim 7, further comprising receiving information of an index indicating one of the quantization code table and the quantization matrix table for every image of the encoded image signal, and decoding one of the quantization code table and the quantization matrix according to the information of the index.

10. The video decoding method according to claim 7, further comprising changing one of the quantization code table and the quantization matrix table according to a value of the quantization parameter of the macroblock.

11. The image decoding method according to claim 7, further comprising receiving an index of a quantization matrix for every macroblock, dequantizing the macroblock according to a quantization matrix used for the macroblock and derived from a quantization matrix table corresponding to the received quantization matrix, and changing the quantization matrix table for every image of the encoded image signal.

12. The image decoding method according to claim 11, further comprising receiving an index indicating one of the quantization code table and the quantization matrix table for every image of the encoded image signal, and decoding the macroblock with switching execution and non-execution of dequantization using one of the quantization code table and the quantization matrix table.

13. The image decoding method according to claim 11, further comprising receiving information of an index indicating one of the quantization code table and the quantization matrix table for every image of the encoded image signal, and decoding one of the quantization code table and the quantization matrix according to the information of the index.

14. The video decoding method according to claim 11, further comprising changing one of the quantization code table and the quantization matrix table according to a value of the quantization parameter of the macroblock.

15. An image encoding apparatus of encoding an image signal according to an encoding mode, comprising:
a table to store a plurality of quantization code tables;
a first generator to generate a predictive signal and encoding mode information according to each of a plurality of encoding modes from a macroblock signal corresponding to each macroblock of a plurality of macroblocks generated by dividing an input image signal;
a first selector to select a quantization code table corresponding to each macroblock from the quantization code tables;
a second generator to generate a predictive error signal for each of the encoding modes based on the macroblock signal and the predictive signal;
a transformer to subject the predictive error signal to orthogonal transformation;
a quantizer to quantize the orthogonal-transformed predictive error signal while changing a quantization parameter for every plural sub-pixel-blocks in the macroblock, using the quantization code table corresponding to the macroblock to generate a quantization transformation coefficient;
a first encoder to encode the quantization transformation coefficient;
a calculator to calculate an encoding cost from encoding distortion and number of encoded bits of the encoded quantization transformation coefficient;
a second selector to select one encoding mode from the encoding modes based on the encoding cost;
a third selector to select one quantization code table from the quantization code tables based on the encoding cost;
a second encoder to encode information of an index indicating the selected quantization code table for every encoding part of the input image signal, the encoding part including one of a frame of the input image signal and a region of the frame.

16. The video encoding apparatus according to claim 15, further comprising a selector to select a quantization matrix corresponding to each macroblock, a quantizer to quantize the orthogonal-transformed predictive error signal using the quantization matrix to generate a quantized transformation coefficient, and a selector to select one quantization matrix from a plurality of quantization matrices based on the encoding cost calculated from this quantized transformation coefficient.

17. An image decoding apparatus of decoding an encoded image signal, comprising:
a receiver to receive an index of a quantization code table for each macroblock of an encoded image signal;
a dequantizer to dequantize the macroblock while changing a quantization parameter according to the quantization code table corresponding to the index for every plural sub-pixel-blocks in the macroblock; and
a switch to change the quantization code table for every image of the encoded image signal, the image including one of a frame of the encoded image signal and a region of the frame.

18. The image decoding apparatus according to claim 17, further comprising a receiving unit configured to receive an index of a quantization matrix for every macroblock, a dequantizer to dequantize the macroblock according to a quantization matrix used for the macroblock and derived from a quantization matrix table corresponding to the received quantization matrix, and a changing unit configured to change the quantization matrix table for every image of the encoded image signal.

* * * * *